US007002565B2

(12) United States Patent
Allen et al.

(10) Patent No.: US 7,002,565 B2
(45) Date of Patent: Feb. 21, 2006

(54) SIGNALING DISPLAY DEVICE TO AUTOMATICALLY CHARACTERIZE VIDEO SIGNAL

(75) Inventors: William J. Allen, Corvallis, OR (US); James R Cole, Albany, OR (US); Brian S Dixon, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

(21) Appl. No.: 10/232,791

(22) Filed: Aug. 28, 2002

(65) Prior Publication Data

US 2004/0041746 A1 Mar. 4, 2004

(51) Int. Cl.
*G09G 5/00* (2006.01)
*H04N 3/27* (2006.01)

(52) U.S. Cl. ....................... 345/204; 345/699; 348/558

(58) Field of Classification Search ........ 345/698–699, 345/204, 622; 348/554–555, 558
See application file for complete search history.

(56) References Cited

U.S. PATENT DOCUMENTS

| | | | | | |
|---|---|---|---|---|---|
| 4,303,938 | A | * | 12/1981 | Berke et al. | 348/181 |
| 5,781,185 | A | | 7/1998 | Shin | |
| 5,953,074 | A | | 9/1999 | Reddy | |
| 6,061,048 | A | * | 5/2000 | Choi | 715/785 |
| 6,115,009 | A | | 9/2000 | Ikegami | |
| 6,195,123 | B1 | | 2/2001 | Meguro et al. | |
| 6,611,249 | B1 | * | 8/2003 | Evanicky et al. | 345/102 |
| 6,724,381 | B1 | * | 4/2004 | Sakashita | 345/213 |
| 2002/0067351 | A1 | | 6/2002 | Kim | |

* cited by examiner

*Primary Examiner*—Patrick N. Edouard
*Assistant Examiner*—Duc Q Dinh

(57) ABSTRACT

Signaling a display device to automatically characterize a video signal is disclosed. In a method of an embodiment of the invention, a display device that has a video signal characterization circuit is signaled to automatically characterize a video signal of a video source. A predetermined characterization image is provided on the video signal of the video source for the display device to automatically characterize.

34 Claims, 5 Drawing Sheets

SIGNALING DISPLAY DEVICE TO AUTOMATICALLY CHARACTERIZE VIDEO SIGNAL

BACKGROUND

Many types of display devices characterize a video signal so that they properly display the video signal. Characterization includes determining the height and width of the image conveyed by the video signal, which are also referred to as the boundaries of the image. Characterization may determine, for example, that a video signal conveys an image of 640×480 pixels, 1024×768 pixels, and so on. Characterization also includes determining the timing of the video signal. The timing of the video signal indicates how often the image conveyed by the video signal is refreshed, such as 60 hertz (Hz), 85 Hz, and so on. Characterization may additionally include other determinations, such as determining the actual voltage levels of an analog video signal, and determining an appropriate gamma adjustment or calibration, or, more generally, delinearization. Once a display device has properly characterized the video signal, it is able to optimally display the image conveyed by the video signal, including sizing the image properly, synchronizing to the video signal, and so on.

Typically a display device characterizes the video signal of a video source when the video source is first selected for display by the device, including when the device is first turned on, where the display device may have inputs corresponding to a number of different video sources. Most of the time the display device will likely properly characterize the video signal based on whatever image happens to be currently provided on the video signal. However, at times the display device will improperly characterize the video signal, because the image being currently provided on the video signal is not well suited for characterizing the signal. As a result, the display device may not optimally display the image conveyed by the video signal. The user of the device may become concerned that the device has malfunctioned, or perhaps worse, conclude that the device is of lower quality than previously thought.

For these and other reasons, there is a need for the present invention.

SUMMARY OF THE INVENTION

In a method of an embodiment of the invention, a display device that has a video signal characterization circuit is signaled to automatically characterize a video signal of a video source. A predetermined characterization image is provided on the video signal of the video source for the display device to automatically characterize.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

System and Method

Figure 1:
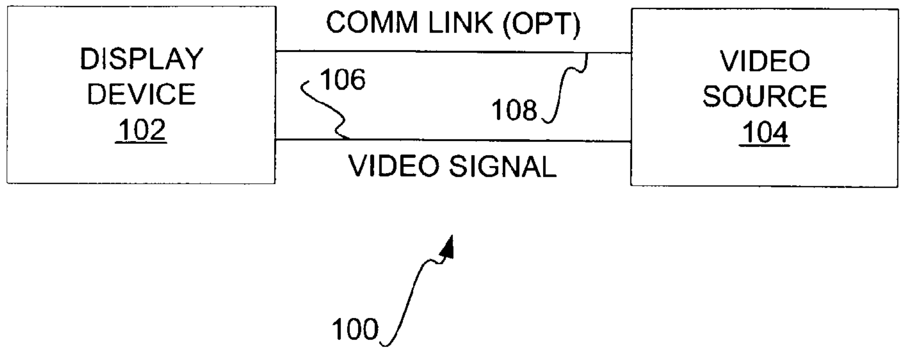
FIG. 1 is a block diagram of a system including a display device and a video source, according to an embodiment of the invention.

FIG. 1 shows a system 100 according to an embodiment of the invention. The system 100 includes a display device 102 and a video source 104. The display device 102 preferably includes a video signal characterization circuit to automatically characterize the video signal 106 provided by the video source 104. The characterization is automatic in that it is performed without user interaction. The display device 102 may be one or more of a liquid crystal display (LCD), a flat panel display, a plasma display, a projector, a high definition (HD) display, and a cathode-ray tube (CRT) display, among other types of displays. The video signal 106 may be provided on an output of the video source 104. The output may be one or more of a VGA output, a DFP output, an SDI output, a DVI-I output, a DVI-A output, a DVI-D output, a P&D output, as well as other types of video outputs, such as an S-video output, an RGBHV output, a YPbPr component video output, a YUV output, and an SCART output.

The video source 104 provides an image on the video signal 106 for display by the display device 102. For purposes of automatic characterization of the video signal 106 by the display device 102, the video source 104 is able to provide a predetermined characterization image on the video signal 106, as is described in more detail in a subsequent section of the detailed description. The video source 104 may also include an optional communications link 108 to communicate with the display device 102, apart from the video signal 106. The video source 104 may be one or more of a computing device, like a laptop or a desktop computer, a home theatre component or device, a video component or device, and so on. The communications link 108 may be one or more of a wired link, a wireless link, a serial cable, a Universal Serial Bus (USB) cable, a IEEE1394 (FireWire) cable, a parallel cable, a DDC cable, and so on. The link 108 may also be integrated within the video signal 106 in an alternative embodiment of the invention.

Figure 2:
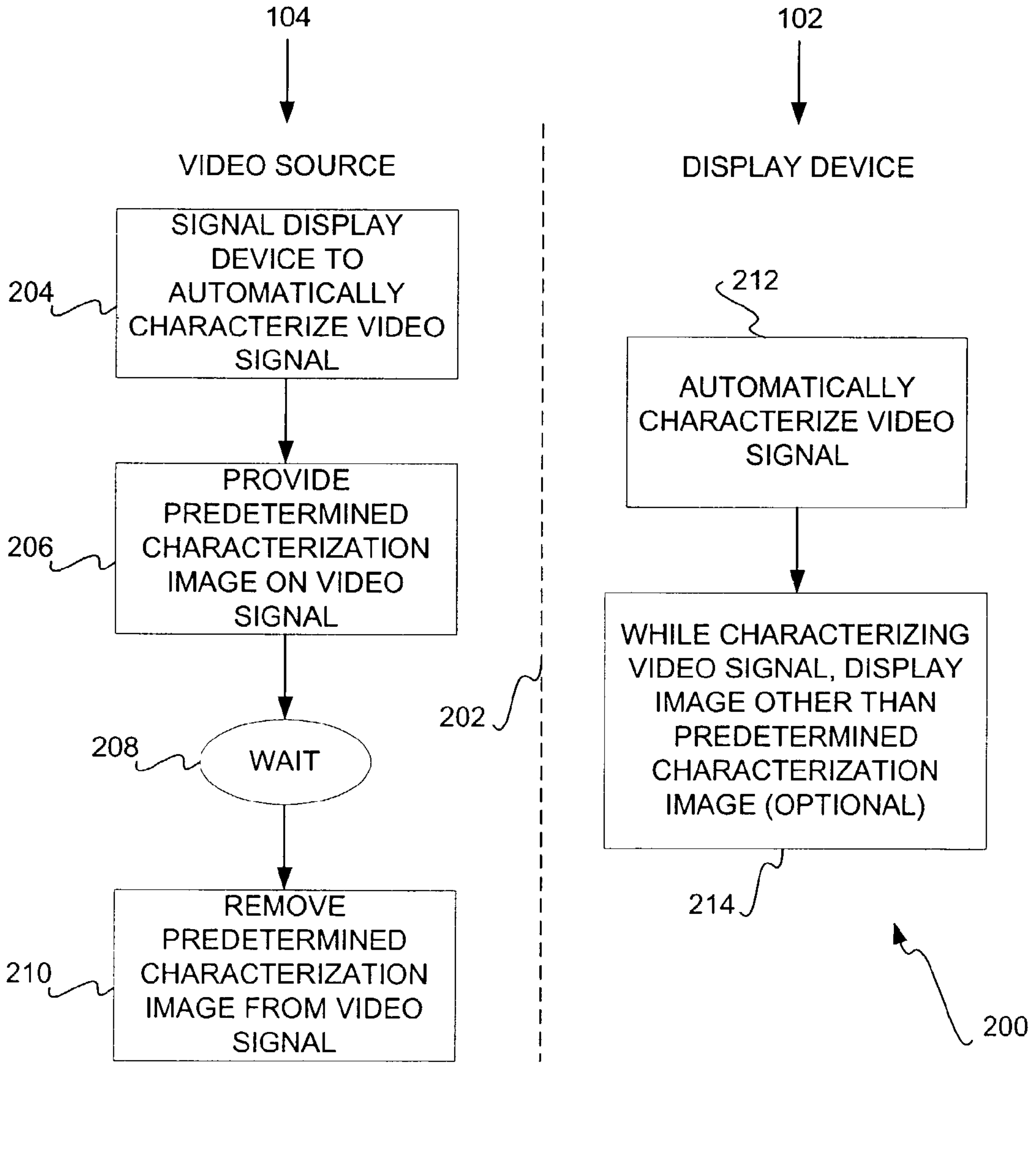
FIG. 2 is a flowchart of a method, according to an embodiment of the invention.

FIG. 2 shows a method 200 according to an embodiment of the invention, which has parts performed by the video source 104 and the display device 102, as separated by the dotted line 202. The method 200 may be implemented as a computer program stored on a computer-readable medium, such as a removable or fixed storage, like an optical disk, a floppy disk, a hard disk drive, a semiconductor memory, and so on. The video source 104 first signals the display device 102 to automatically characterize the video signal 106 (204). The video source 104 provides the predetermined characterization image on the video signal 106 (206), waits for a length of time (208), and then removes the predetermined characterization image from the video signal 106 (210). Alternatively, in another embodiment, rather than waiting for the length of time in 208, the video source 104 waits for the display device 102 to signals when the characterization has been completed, such that the video source 104 then removes the video signal 106 in 210.

The video source 104 may signal the display device 102 to automatically characterize the video signal 106 in a number of different ways, according to varying embodiments of the invention. It may switch the video signal 106 off and back on, causing the display device 102 in one embodiment to re-characterize the video signal 106. The video source 104 may signal the display device 102 over the communications link 108 in one embodiment to characterize the video signal 106. Furthermore, the user may in one embodiment manually indicate to the display device 102 to automatically characterize the video signal.

The display device 102 automatically characterizes the video signal 106 on which the predetermined characterization image has been provided, in response to the signaling (212). As has been indicated, characterization of the video signal 106 includes determining the height and width of the image, or the boundaries or the extent of the image, as well as determining the timing of the video signal 106, which is also referred to as synchronizing to the video signal 106. Characterization of the video signal 106 may also include other determinations in addition to or in lieu of determining the height and width of the image, or the timing of the signal 106. Such determinations may include determining an appropriate gamma correction or adjustment in the path of the video signal 106, as well as determining the actual voltage levels of the video signal 106 on an analog link. Gamma correction or adjustment is more generally referred to as delinearization, since the function utilized for the process may be something other than a gamma function, such as a sigmoidal curve. While the display device 102 is characterizing the video signal 106, it may display an image other than the predetermined characterization image (214), so that the user does not have to view the image on the display device 102 during the characterization process.

Video Source and Display Device

Figure 3:
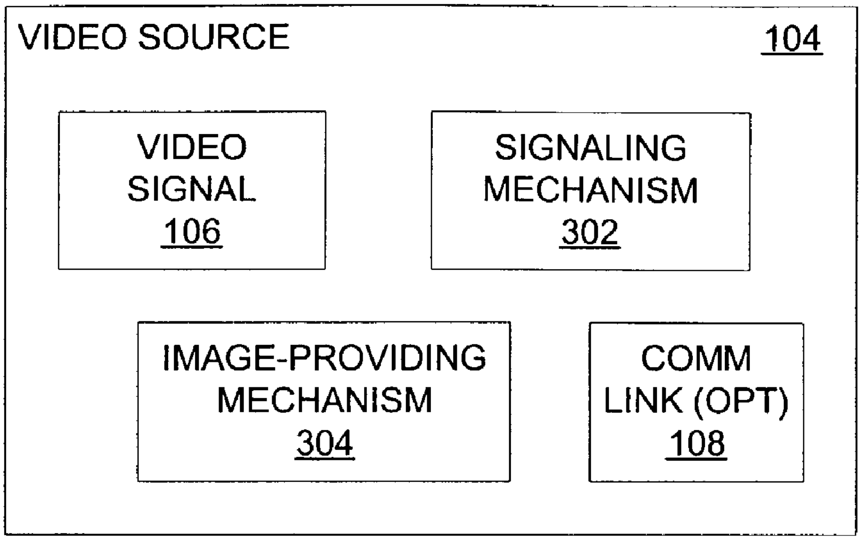
FIG. 3 is a block diagram of a video source, according to an embodiment of the invention.

FIG. 3 shows the video source 104 in more detail, according to an embodiment of the invention. The video source 104 specifically includes the video signal 106, a signaling mechanism 302, an image-providing mechanism 304, and the optional communications link 108. Each of the mechanisms 302 and 304 may be considered the means for performing its respective functionality. Each of the mechanisms 302 and 304 may further be implemented as software, hardware, or a combination of software and hardware.

The signaling mechanism 302 is the mechanism that signals to the display device 104 to automatically characterize the video signal 106. The signaling mechanism 302 may switch the video signal 106 off and back on to signal to the display device 104 to automatically characterize the video signal 106. The signaling mechanism 302 may alternatively signal the display device 124 over the communications link 108 for the device 104 to automatically characterize the video signal 106.

The image-providing mechanism 304 is the mechanism that formulates and provides the image on the video signal 106. In normal operation, for instance, the image-providing mechanism 304 may provide the image normally seen on a computer screen, a television screen, and so on. When the signaling mechanism 302 signals the display device 102 to automatically characterize the video signal 106, the image-providing mechanism 304 instead provides the predetermined characterization image on the video signal 106, so that the display device 102 properly characterizes the video signal 106.

Figure 4:
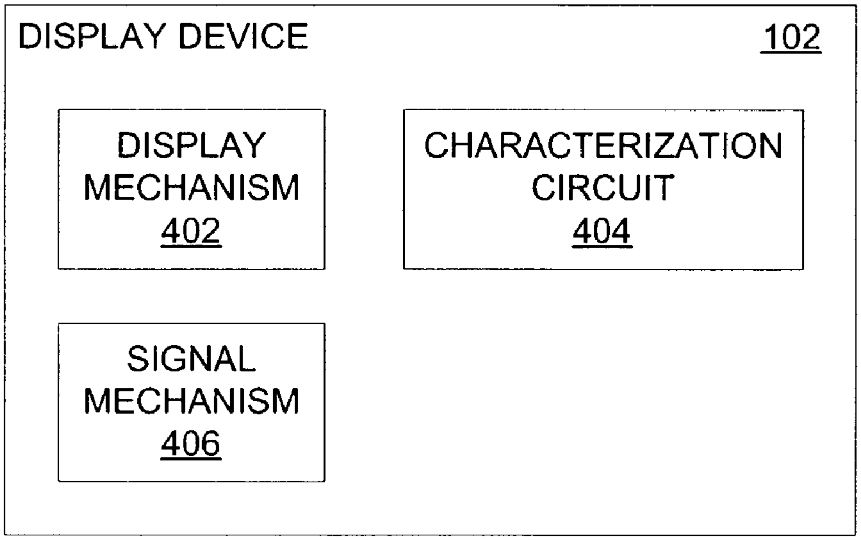
FIG. 4 is a block diagram of a display device, according to an embodiment of the invention.

FIG. 4 shows the display device 102 in more detail, according to an embodiment of the invention. The display device 102 specifically includes a display mechanism 402, a characterization circuit 404, and a signal mechanism 406. Each of the mechanisms 402 and 406 may be considered the means for performing its respective functionality. Each of the mechanisms 402 and 406 may further be implemented as software, hardware, or a combination of software and hardware.

The display mechanism 402 is the mechanism that actually displays the video signal 106 of the video source 104. That is, it is the mechanism that displays the image provided on the video signal 106. The display mechanism 402 is dependent on the type of display device 102. For example, it is a plasma display mechanism where the display device 102 is a plasma display, a liquid crystal display (LCD) mechanism where the display device 102 is an LCD, and so on. Furthermore, the display mechanism 402 may display an image other than that being provided on the video signal 106 while the characterization circuit 404 is automatically characterizing the video signal 106. The characterization circuit 404 is thus the circuit that automatically characterizes the video signal 106 of the video source 104, for proper and/or optimal display of the image conveyed on the video signal 106.

The signal mechanism 406 is the mechanism that receives a signal to indicate to the characterization circuit 404 to automatically characterize the video signal 106 of the video source 104. The signal mechanism 406 may detect when the video signal 106 of the video source 104 has been turned off and back on, to cause the characterization circuit 404 to re-characterize the video signal 106. Where there are a number of different video inputs of the display device 102, and the video signal 106 is provided at the currently active input, the signal mechanism 406 may stay on the active input for a few seconds when this input is turned off, before checking the other inputs for an active signal. Thus, when the video signal 106 is turned back on, the input of the device 102 on which the signal 106 is incoming is still active, and the signal mechanism 406 causes the circuit 404 to re-characterize the video signal 106.

In another embodiment, the signal mechanism 406 is an input device by which a user manually signals the characterization circuit 404 to automatically characterize, including automatically re-characterizing as may be the case, the video signal 106 of the video source 104. For instance, the input device may be a button intended for this purpose, a menu item within a menu of actions that the user can take relative to the display device 102, and so on. The signal mechanism 406 may also be or include the optional communications link 108, over which the characterization circuit 404 is signaled to automatically characterize the video signal 106 of the video source 104.

Predetermined Characterization Image

Figure 5A:
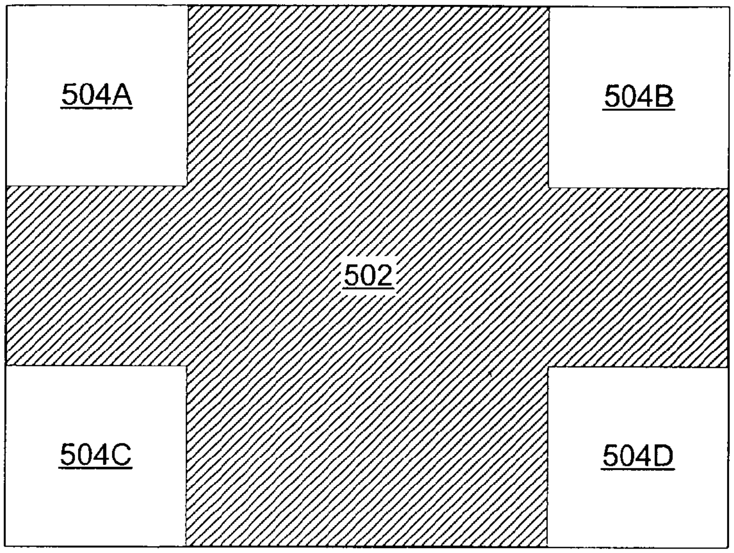
FIGS. 5A, 5B, 5C, 5D, 5E, and 5F are diagrams of predetermined characterization images, according to varying embodiments of the invention.
Figure 5B:
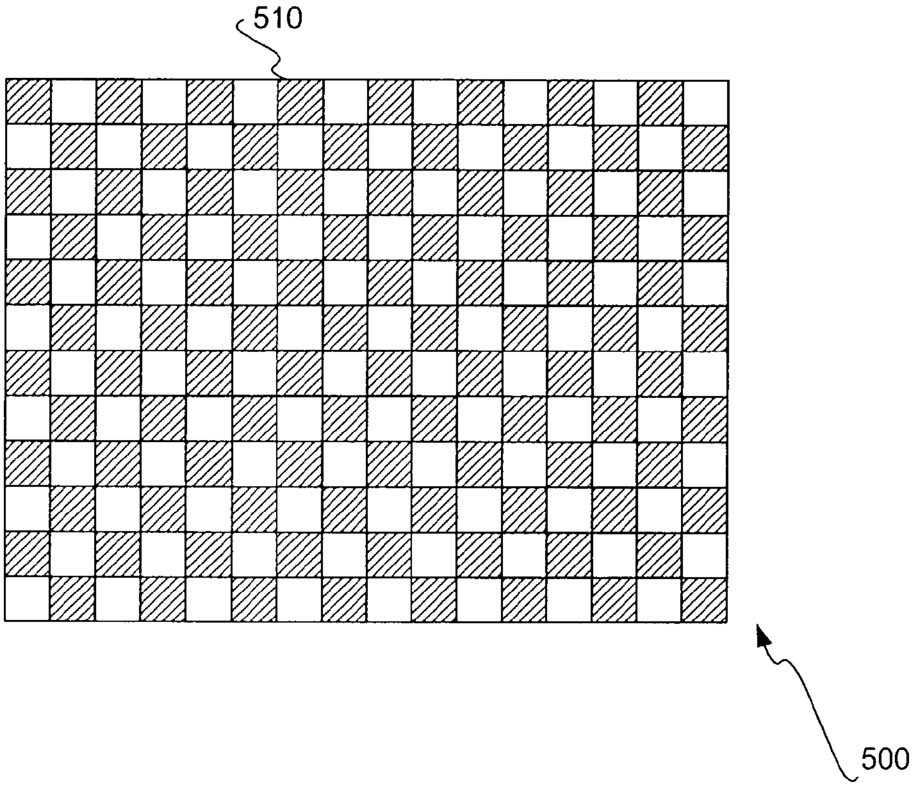
Figure 5C:
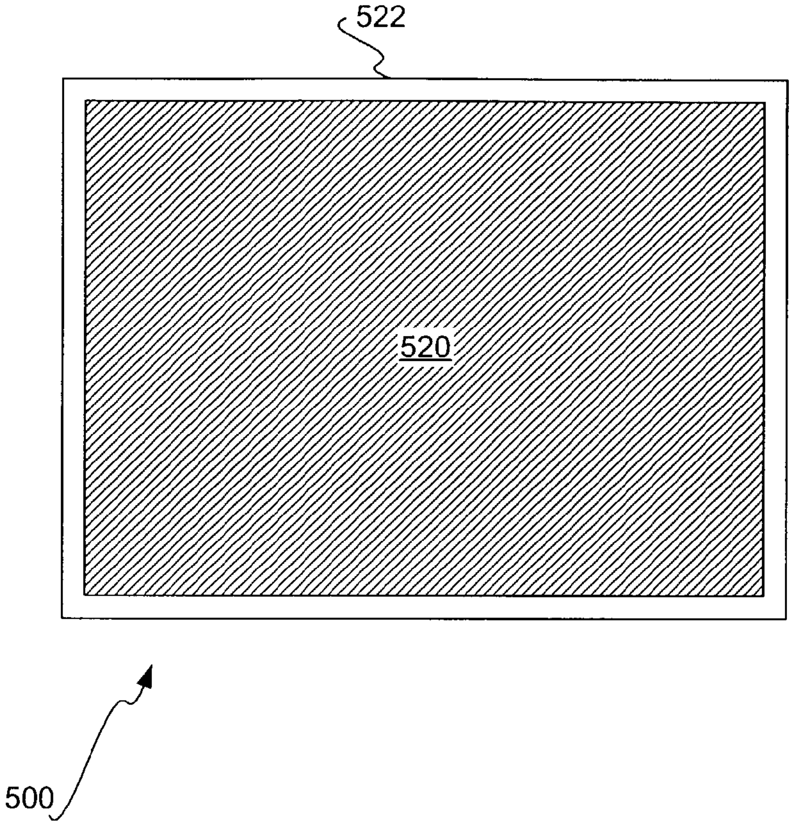

FIGS. 5A, 5B, and 5C show a predetermined characterization image 500, according to varying embodiments of the invention. The video source 104 provides the image 500 on the video signal 106, so that the display device 102 is more easily able to characterize the video signal 106 in a proper and/or optimal manner. Each of the parts of the image 500 of FIGS. 5A, 5B, and 5C may be considered the means for performing its respective functionality. A computer-readable medium may store data that represents the predetermined characterization image 500. The medium 500 may be a removable or fixed storage, like an optical disk, a floppy disk, a hard disk drive, a semiconductor memory, and so on.

In the embodiment of FIG. 5A, the predetermined characterization image 500 includes a predominantly black area 502 having predominantly white corner areas 504A, 504B, 504C, and 504D. Alternatively, the area 502 may be white, and the corner areas 504A, 504B, 504C, and 504D may be black. The corner areas 504A, 504B, 504C, and 504D, or corner blocks, assist the display device 102 in determining the extent, or boundaries, of the image conveyed on the video signal 106, so that the display device 102 can properly display the image provided on the video signal 106. Furthermore, in one embodiment, the corner areas 504A, 504B, 504C, and 504D may be sufficiently large that they meet in the middle, and possibly are sufficiently extensive to have the entire image 500 be of the same color. The term corner areas as used herein is inclusive of such sufficiently large areas.

For purposes of determining the actual voltage levels of the video signal 106, the corner areas 504A, 504B, 504C, and 504D may be differently colored. For example, the corner areas 504A, 504B, 504C, and 504D may be or include regions of red at maximum intensity, green at maximum intensity, and blue at maximum intensity, since red, green, and blue are the color components that make up all possible colors of the image that is provided on the video signal 106. Red, green, and blue are a specific case of color components that make up all possible colors of the image, and other colors of other color spaces can also be used. The characterization image 500 thus includes elements to produce maximum and minimum voltage levels of the video signal 106 for each of these colors.

In the embodiment of FIG. 5B, the predetermined characterization image 500 includes a checkerboard area 510. The checkerboard area 510 alternates between black areas of one or more black pixels and white areas of one or more white pixels. The checkerboard area 510 assists the display device 102 in determining the timing of the video signal 106, so that the display device 102 properly synchronizes to the video signal 106. The checkerboard area 510 may also include the colors that are the color components that make up all possible colors of the image that is provided on the video signal 106, to assist in determining the actual voltage levels of the video signal 106.

In the embodiment of FIG. 5C, the predetermined characterization image 500 includes a predominantly black area 520 surrounded by a white border 522. Alternatively, the area 520 may be white, and the border 522 may be black. The border 522 is one or more pixels in width. The border 522 also assists the display device 102 in determining the extent, or boundaries, of the image conveyed on the video signal 106, so that the display device 102 can properly display the image provided on the video signal 106. As in the embodiments of FIGS. 5A and 5B, the embodiment of FIG. 5C can also include the colors that make up all possible colors of the image that is provided on the video signal 106, to assist in determining the actual voltage levels of the video signal 106.

Figure 5D:
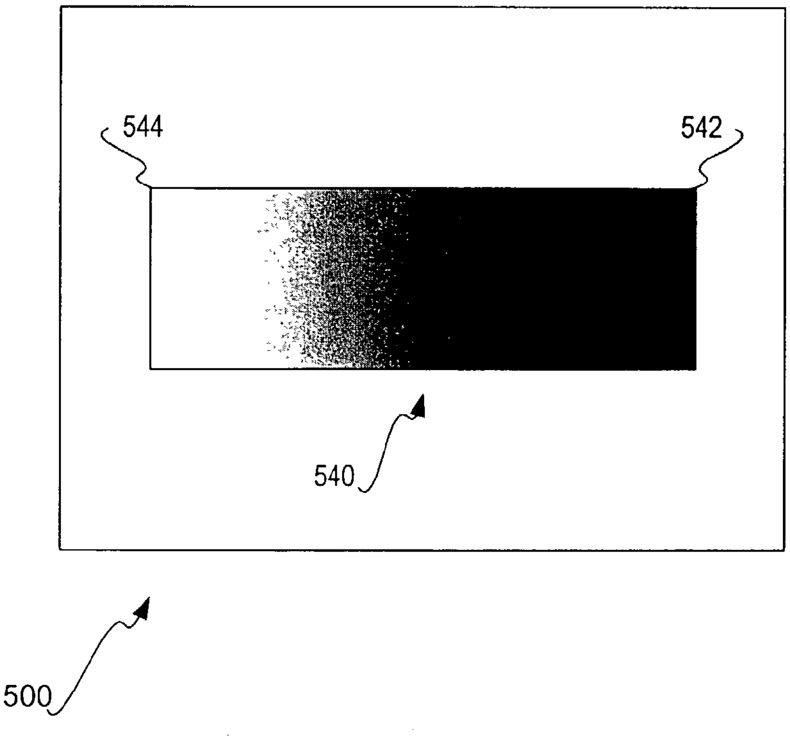
Figure 5E:
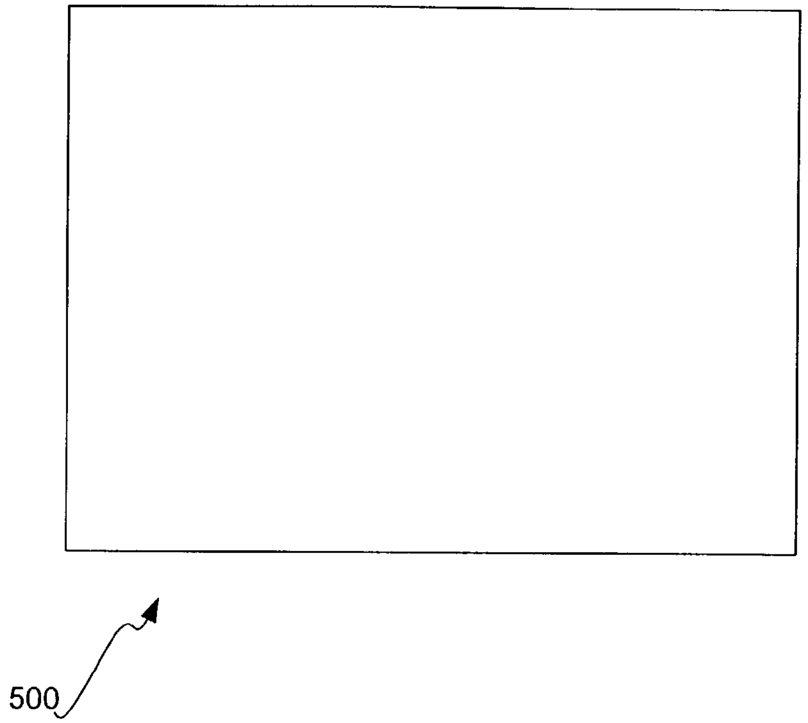

In the embodiment of FIG. 5D, the predetermined characterization image 500 includes a linear grayscale ramp 540, which progresses from completely black on an end 542 thereof to completely white on another end 544 thereof. The ramp 540 assists in delinearization. Such delinearization may be gamma adjustment or correction, or another type of delinearization. In the embodiment of FIG. 5E, the predetermined characterization image 500 is completely of one color, such as completely black, completely white, and so on, where the term color as used herein is inclusive of black, white, and so on.

Figure 5F:
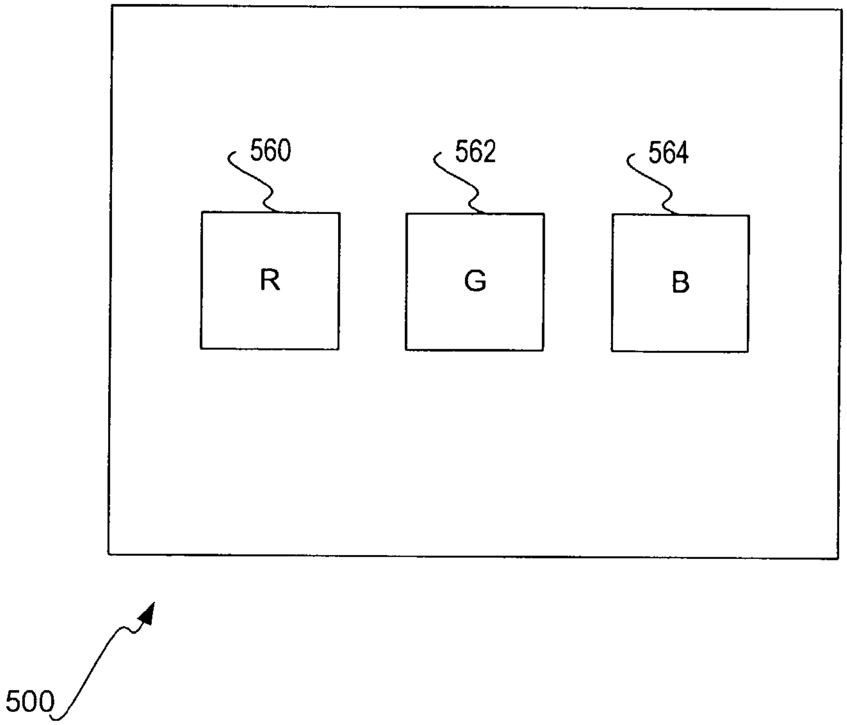

In the embodiment of FIG. 5F, the image 500 includes maximum intensity regions 560, 562, and 564, of the colors red, green, and blue. As has been indicated, these colors are the color components that make up all possible colors of the image that is provided on the video signal 106, and the colors of other color spaces can also alternatively be used. Maximum intensity regions of these colors assist in determining the actual voltage levels of the video signal 106. The maximum intensity red, green, and/or blue area(s) may also be effectuated in the image 500 in a way other than that which has been shown and described, as well.

In other embodiments of the invention, the predetermined characterization image 500 may be a combination of the parts of the embodiments of FIGS. 5A, 5B, 5C, 5D, 5E, and 5F. Other parts may also be included in the image 500, besides those shown in FIGS. 5A, 5B, 5C, 5D, 5E, and 5F. For instance, lines and/or line patterns may be included in the predetermined characterization image 500 to also assist the display device 102 in determining the timing of the video signal 106. Furthermore, areas may be included in the image 500 that are not meant for assisting the display device 102 in characterizing the video signal, such as company logos, user messages, and so on. Finally, as has been indicated, whereas the parts of the image 500 in FIGS. 5A, 5B, and 5C have been shown as being black or white, they can also be the opposite color, such as white instead of black, and vice versa.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A method comprising:

signaling a display device having a video signal characterization circuit to automatically characterize a video signal of a video source;

providing a predetermined characterization image on the video signal of the video source for the display device to automatically; and, removing the predetermined characterization image from the video signal of the video source after waiting a length of time and/or after waiting for the display device to signal that characterization has been completed.

2. The method of claim 1, wherein signaling the display device comprises switching the video signal of the video source off and back on.

3. The method of claim 1, wherein signaling the display device comprises signaling the display device over a communications link other than the video signal of the video source.

4. The method of claim 1, wherein signaling the display device comprises a user manually indicating to the display device to automatically characterize the video signal.

5. The method of claim 1, wherein providing the predetermined characterization image comprises providing the predetermined characterization image as comprising one or more of:

at least one checkerboard area alternating between at least one black pixel and at least one white pixel; and, a primary area having a color selected from black and white and having at least one of:

a number of corner areas having a color opposite to the color of the primary area; and, a border having a color opposite to the color of the primary area.

6. The method of claim 1, wherein providing the predetermined characterization image comprises providing the predetermined characterization image as having one or more areas for assisting the display device to determine boundaries of the predetermined characterization image provided on the video signal, and one or more areas for assisting the display device to determine timing of the video signal.

7. A method comprising:

automatically characterizing by a display device having a video signal characterization circuit of a video signal of a video source on which a predetermined characterization image has been provided; and, displaying an image other than the predetermined characterization image by the display device while automatically characterizing the video signal, wherein the predetermined characterization image is removed from the video signal of the video source after a length of time has been waited for and/or after the display device has signaled that characterization has been completed.

8. The method of claim 7, wherein automatically characterizing by the display device of the video signal comprises synchronizing to the video signal.

9. A method comprising:

by a video source, signaling a display device having a video signal characterization circuit to automatically characterize a video signal of the video source;

providing a predetermined characterization image on the video signal of the video source for the display device to automatically character;

by the display device, automatically characterizing the video signal of the video source on which the predetermined characterization image has been provided;

displaying an image other than the predetermined characterization image while automatically characterizing the video signal;

by the video source, removing the predetermined characterization image from the video signal of the video source after waiting a length of time and/or after waiting for the display device to signal that characterization has been completed.

10. A video source comprising:

a video signal having a predetermined characterization image; and, a mechanism to signal to a display device having a video signal characterization circuit to automatically characterize the video signal, and to remove the predetermined characterization image from the video signal of the video source after a length of time has been waited for and/or after the display device has signaled that characterization has been completed.

11. The video source of claim 10, further comprising a mechanism to provide the predetermined characterization image on the video signal for the display device to automatically characterize.

12. The video source of claim 11, wherein the predetermined characterization image comprises one or more of:

an area that is one of completely black and completely white;

an area having a linear grayscale ramp;

an area having a maximum intensity of one or more colors of a color space;

at least one checkerboard area alternating between at least one black pixel and at least one white pixel; and, a primary area having a color selected from black and white and having at least one of:

a number of corner areas having a color opposite to the color of the primary area; and, a border having a color opposite to the color of the primary area.

13. The video source of claim 11, wherein the predetermined characterization image comprises one or more of:

one or more areas for assisting the display device to determine actual voltage levels of the video signal;

one or more areas for assisting the display device to perform delinearization;

one or more areas for assisting the display device to determine boundaries of the predetermined characterization image provided on the video signal; and, one or more areas for assisting the display device to determine timing of the video signal.

14. The video source of claim 10, further comprising a communications link that is able to be communicatively coupled to the display device and over which the mechanism is able to signal to the display device to automatically characterize the video signal.

15. The video source of claim 10, wherein the mechanism switches the video signal off and back on to signal to the display device to automatically characterize the video signal.

16. The video source of claim 10, wherein the video source is a computing device.

17. A video source comprising:

a video signal having a predetermined characterization image; and, means for signaling to a display device having a video signal characterization circuit to automatically characterize the video signal, and for removing the predetermined characterization image from the video signal of the video source after a length of time has been waited for and/or after the display device has signaled that characterization has been completed.

18. The video source of claim 17, further comprising means for providing the predetermined characterize image on the video signal for the display device to automatically characterize.

19. A display device comprising:

a display mechanism to display a video signal of a video source;

a characterization circuit to automatically characterize the video signal of the video source based on a predetermined characterization image on the video signal; and, a signal mechanism to receive a signal to indicate to the characterization circuit to automatically characterize the video signal of the video source, wherein the predetermined characterization image is removed from the video signal of the video source after a length of time has been waited for and/or after the display device has signaled that characterization has been completed.

20. The display device of claim 19, wherein the display mechanism displays an image other than the video signal of the video source while the characterization circuit automatically characterizes the video signal.

21. The display device of claim 19, wherein the signal mechanism comprises an input device by which a user manually signals the characterization circuit to automatically characterize the video signal of the video source.

22. The display device of claim 19, wherein the signal mechanism comprises a communications link that is able to be communicatively coupled to the video source and over which the characterization circuit is able to be signaled to automatically characterize the video signal of the video source.

23. The display device of claim 19, wherein the display device is at least one of a liquid crystal display (LCD), a flat panel display, a plasma display, a projector, a high definition (HD) display, and a cathode-ray tube (CRT) display.

24. A display device comprising:

a characterization circuit to automatically characterize a video signal of a video source based on a predetermined characterization image on the video signal; and, means for receiving a signal to indicate to the characterization circuit to automatically characterize to the video signal of the video source, wherein the predetermined characterization image is removed from the video signal of the video source after a length of time has been waited for and/or after the display device has signaled that characterization has been completed.

25. The display device of claim 24, further comprising means for displaying an image other than the video signal while the characterization circuit automatically characterizes the video signal of the video source.

26. A display device comprising:

a characterization circuit to automatically characterize a video signal of a video source based on a predetermined characterization image on the video signal; and, a display mechanism to display the video signal of the video source, the display mechanism displaying an image other than the video signal while the characterization circuit automatically characterizes the video signal, wherein the predetermined characterization image is removed from the video signal of the video source after a length of time has been waited for and/or after the display device has signaled that characterization has been completed.

27. The display device of claim 26, further comprising a signal mechanism to receive a signal to indicate to the characterization circuit to automatically characterizes the video signal of the video source.

28. A system comprising:

a video source capable of signaling a display device to automatically characterize a video signal of the video source and capable of providing a predetermined characterization image on the video signal for the display device to automatically characterize; and, a display device capable of receiving the signaling from the video source to automatically characterize the video signal and capable of automatically characterizing the video signal of the video source, wherein the video source is to remove the predetermined characterization image from the video signal of the video source after a length of time has been waited for and/or after the display device has signaled that characterization has been completed.

29. The system of claim 28, wherein the video source switches the video signal off and back on to signal to the display device to automatically character the video signal.

30. The system of claim 28, wherein the video source comprises a computing device.

31. The system of claim 28, wherein the display device displays an image other than the video signal of the video source while automatically characterizing the video signal.

32. The system of claim 28, wherein the display device is at least one of a liquid crystal display (LCD), a flat panel display, a plasma display, a projector, a high definition (HD) display, and a cathode-ray tube (CRT) display.

33. A computer-readable medium having a computer program stored thereon to perform a method comprising:

signaling a display device having a video signal characterization circuit to automatically characterize a video signal of a video source;

providing a predetermined characterization image on the video signal of the video source for the display device to automatically characterize; and, removing the predetermined characterization image from the video signal of the video source after waiting a length of time and/or after waiting for the display device to signal that characterization has been completed.

34. The medium of claim 33, wherein providing the predetermined characterization image comprises providing the predetermined characterization image as having one or more areas for assisting the display device to determine boundaries of the predetermined characterization image provided on the video signal, and one or more areas for assisting the display device to determine timing of the video signal.

* * * * *